United States Patent Office 3,332,792
Patented July 25, 1967

3,332,792
MANUFACTURE OF ANTIHALATION LAYERS
E Scudder Mackey, Binghamton, N.Y., assignor to General Aniline & Film Corporation, New York, N.Y., a corporation of Delaware
No Drawing. Filed Sept. 27, 1963, Ser. No. 311,954
5 Claims. (Cl. 106—130)

This invention relates to the manufacture of antihalation layers for photographic film and, more particularly, to the manufacture of such layers from pyrolusite.

The use of pyrolusite or manganese dioxide for the manufacture of antihalation layers is extremely well known and various processes have been suggested for achieving the proper particle size and color of the pyrolusite for antihalation use. One such process involved reducing potassium permanganate with an alcohol in an aqueous solution and thereafter milling or grinding the manganese dioxide pigment (pyrolusite) and subsequently redispersing it in a colloid. Another method involved reacting potassium permanganate with gelatin wherein gelatin served both as the reducing agent and the suspending agent. Still another employed polyvinyl alcohol as a reducing agent for the permanganate and as the suspending agent for the colloidal manganese dioxide produced by such reduction.

All of these processes were attended by certain disadvantages which mitigated against their commercialization. Thus the technique of using alcohol as a reducing agent followed by grinding of the pigment led to particles of uneven size and distribution. On the other hand, the use of polyvinyl alcohol resulted in a product which after ageing showed residual yellow stain thereby rendering it undesirable for most applications. The practice of using gelatin as the reducing and suspending agent gives rise to many problems such as embrittling the gel, either as a result of reaction with the potassium permanganate, or with excess salts. Additionally, this technique does not produce particles of manganese dioxide of uniform size but tends rather to yield undesirable rubbery masses or agglomerates of large particles which plug filters. Adjustments made to eliminate these problems generally result in antihalation layers of inadequate density.

Therefore, it is an object of this invention to provide a proces sfor the preparation of an antihalation layer containing finely-divided manganese dioxide as the light-absorbing element.

It is still another object of this invention to provide a reliable method for reducing potassium permanganate to manganese dioxide while simultaneously keeping the dioxide pigment uniformly dispersed in a suspending medium.

It has now been discovered that the above objects can be attained by preparing manganese dioxide or pyrolusite through the reduction of potassium permanganate with starch ethers containing a tertiary amino group and corresponding to the formula

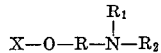

wherein X is starch, R is alkylene, i.e., methylene, ethylene, propylene, isopropylene, butylene, isobutylene, pentamethylene or the like, or hydroxyalkylene, i.e., hydroxyethylene, hydroxypropylene, hydroxybutylene, or the like, and each of $R_1$ and $R_2$ is alkyl, i.e., methyl, ethyl, propyl, butyl, or the like, aryl, i.e., phenyl, toluyl, or the like, or aralkyl, i.e., benzyl. Preferably I use those ethers in which R contains from 1 to 5 carbon atoms and $R_1$ and $R_2$ is alkyl of from 1 to 4 carbon atoms. The ethers may be employed in the form of the free base or in the form of the quaternary ammonium salt such as the hydrohalide, i.e., hydrochloride, hydrobromide, or the like.

The term "starch" is meant to include amylaceuos substances such as untreated starch, as well as starch derivatives including dextrinized, hydrolyzed, oxidized, esterified or etherified starches, wherein the starch may be derived from any source such as corn, wheat, potato, tapioca, waxy maize, sago or rice.

The abovementioned starches act as a reducing agent for the permanganate and also as a suspending agent for the manganese dioxide, so that the resulting colloidal mixture is compatible with gelatin whereby a smooth antihalation layer can be coated on film in the conventional manner.

The ethers contemplated herein are prepared by etherifying starch with an etherifying agent such as a dialkylaminoalkyl epoxide, or halide, an aryl-alkylaminoalkyl epoxide or halide, a diarylaminoalkyl epoxide or halide, a diaralkylaminoalkyl epoxide or halide, such as, for example, are described in U.S. Patents 2,813,093 and 2,917,506.

Representative examples of suitable specific etherification agents for the purpose of making the starch ether derivatives include: β-diethylamino-ethyl chloride, β-diethylamino-isopropyl chloride, β-dimethylamino-ethyl chloride, 3-dibutylamino-1,2-epoxypropane, 2-bromo-5-dipiperidine and N,N-(2,3-epoxypropyl) methyl aniline, diphenylamino-ethyl chloride or dibenzylamino-ethyl chloride.

The abovementioned starch ethers in the stated relationship have certain properties which appear to be unique and are not found when other starches are employed in a similar manner. Thus the starch ethers of this invention react smoothly with permanganate; act as a suspending medium for the manganese dioxide; form a compatible solution system with gelatin; provide adequate color density for antihalation purposes; and do not discolor the processed antihalation layer after ageing.

My process is carried out simply by contacting potassium permanganate in a hot aqueous acid solution of a starch ether and thereafter adding an appropriate amount of gelatin. A conventional hardener such as formaldehyde or mucochloric acid may be added as coating final along with a coating aid such as saponin. The relative amounts of reactants employed are not critical and can vary over a fairly wide range but it is preferred to use the starch ether in an amount by weight of 3 to 5 times the weight of the potassium permanganate. Similarly the amount of gelatin added to the starch-permanganate reaction product is not critical but is preferably from 0.1 to 1 part of the reaction product to 1 part of gelatin.

The following examples will illustrate the best mode for carrying out the invention but it is to be understood that the invention is not restricted thereto.

*Example 1*

800 grams of a corn starch ether corresponding to the formula:

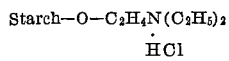

prepared in accordance with Example 1 of U.S. Patent No. 2,813,093, is dissolved in 16 liters of hot water and acidified to a pH of 2.0 to aid in viscosity control. Two hundred (200) grams of potassium permanganate are then added. The solution turns dark brown as the manganese dioxide is formed and held in suspension by the starch.

To the above hot solution is added 1 kilogram of gelatin and the formulation is stirred to permit adequate mixing. The solution is filtered and coated on a filmbase, such as cellulose triacetate, to a thickness sufficient to provide a density of at least 1.5 when measured at a wavelength of 400 millimicrons. The resulting antihalation layer is of extremely good quality and characterized by uniformity of pigment dispersion throughout the gelatin layer.

*Example II*

The procedure of Example I is repeated with the exception that a corn starch ether corresponding to the formula:

$$\text{Starch} - \text{O} - \text{C}_2\text{H}_5\text{N}(\text{C}_2\text{H}_5)_2$$

is employed. This example also produces antihalation layers of excellent quality.

*Example III*

The procedure of Example I is repeated with the exception that an acid converted corn starch ether corresponding to the formula:

$$\underset{\underset{\text{CH}_3}{|}}{\text{Starch} - \text{O} - \text{C}} \text{HCH}_2 - \underset{\underset{\text{CH}_3}{|}}{\text{N}} - \text{CH}_3 \cdot \text{HCl}$$

is employed. The antihalation layer which is produced is also of excellent quality.

Many modifications will appear obvious to those skilled in the art and it is not intended that this invention be limited except as necessitated by the appended claims.

What is claimed is:

1. A process for the preparation of an antihalation layer which comprises contacting potassium permanganate with a starch ether in aqueous acid solution, said ether being selected from the class consisting of those having the formula:

$$\underset{\underset{\text{R}_2}{|}}{\text{X} - \text{O} - \text{R} - \text{N}} - \text{R}_1$$

and the quaternary ammonium salts thereof wherein X is starch, R is a radical selected from the group consisting of alkylene and hydroxyalkylene radicals and each of $R_1$ and $R_2$ is a radical selected from the group consisting of alkyl, aryl and aralkyl radicals, and thereafter adding gelatin to the starch permanganate reaction product.

2. The process as defined in claim 1 wherein R contains from 1 to 5 carbon atoms and $R_1$ and $R_2$ is alkyl of from 1 to 4 carbon atoms.

3. The process as defined in claim 5 wherein 1 part of gelatin is added for 0.1 to 1.0 part of the starch permanganate reaction product.

4. The process as defined in claim 1 wherein the starch has the following formula:

$$\underset{\text{HCl}}{\text{Starch} - \text{O} - \text{C}_2\text{H}_4\text{N}(\text{C}_2\text{H}_5)_2}$$

5. The process as defined in claim 1 wherein the starch ether corresponds to the formula:

$$\underset{\underset{\text{CH}_3}{|}}{\text{Starch} - \text{O} - \overset{\text{HCl}}{\text{C}}\text{HCH}_2 - \underset{\underset{\text{CH}_3}{|}}{\text{N}} - \text{CH}_3}$$

References Cited

UNITED STATES PATENTS

| | | | |
|---|---|---|---|
| 2,095,018 | 10/1937 | Wilmanns et al. | 96—84 |
| 2,813,093 | 11/1957 | Caldwell et al. | 260—233.3 |
| 2,917,506 | 12/1959 | Caldwell et al. | 260—233.3 |
| 3,049,538 | 8/1962 | Brobst | 260—233.3 |

ALEXANDER H. BRODMERKEL, *Primary Examiner.*

D. J. ARNOLD, *Assistant Examiner.*